June 20, 1967   N. S. POLLACK   3,327,042
TARGET GENERATOR DEVICE
Filed Sept. 22, 1965   2 Sheets-Sheet 2

INVENTOR.
NORMAN S. POLLACK
BY
Lawrence Epstein
ATTORNEYS

United States Patent Office 3,327,042
Patented June 20, 1967

3,327,042
TARGET GENERATOR DEVICE
Norman S. Pollack, Commack, N.Y., assignor, by mesne assignments, to the United States of America as represented by the Secretary of the Navy
Filed Sept. 22, 1965, Ser. No. 489,440
6 Claims. (Cl. 35—10.4)

This invention relates to an electronic target generator, and more particularly, to an electronic target generator which is capable of producing a plurality of simulated target signals for use in radar simulators.

Previous electronic target generators had to be tailor made for each particular radar which was being simulated. These target generators were not particularly trouble free, nor were they easily replaceable. A variety of pulse widths were often not simulated. The present invention provides a device which generates a plurality of simulated targets, a normal target, an auxiliary target and an ungated target.

One of the objects of the present invention therefore is to provide an improved target generator.

Another object of this invention is to provide a simulated target generator which is capable of being used to simulate various different radars.

Still another object of the present invention is to provide a target generator for radar simulators which can provide a plurality of simulated target pulses of varying pulse widths.

A further object of the present invention is to provide a target generator which is capable of being used in a variety of different radar simulators under a variety of conditions.

The objects of the invention are met by providing a standardized easily replaceable circuit for generating one, two, or three simulated target signals for use in various radar simulators. The circuit generates a normal target, an auxiliary target, and an ungated target. Any number of the circuits which are on transistorized printed wiring cards can be used in a simulator for a particular radar, depending on the number of targets desired.

Other objects and many of the attendant advantages of this invention will be readily appreciated as the same becomes better understood by reference to the following detailed description when considered in connection with the accompanying drawings wherein.

Similar reference numerals refer to the same element in different figures.

Figure 1:
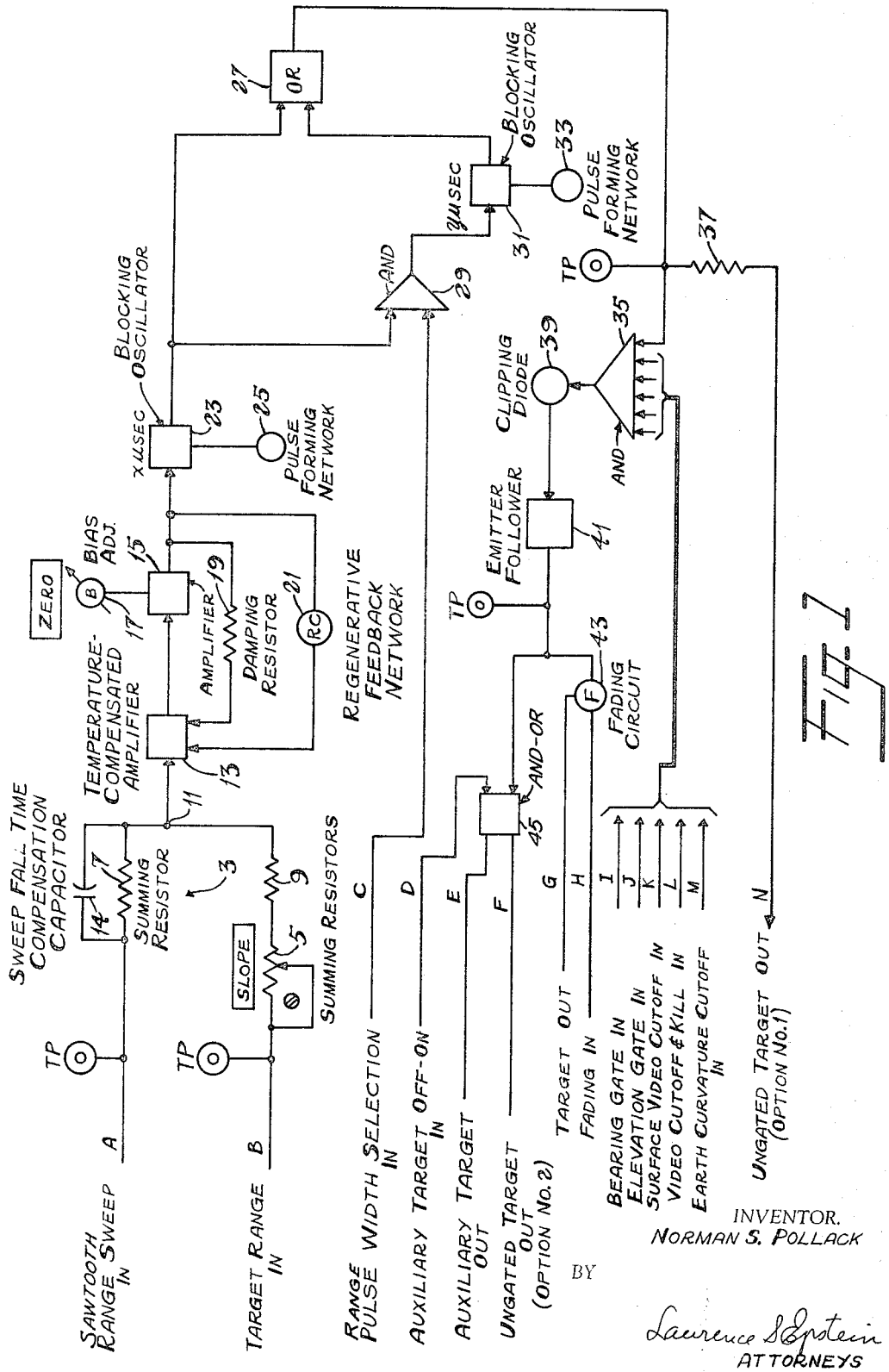
FIG. 1 is a functional block diagram of the present invention.

Referring to FIG. 1, a positive going sawtooth range sweep input signal is applied at one input A of the summing means 3. Applied simultaneously with said range sweep signal at terminal B is a target range input signal which is a negative D.C. voltage, whose amplitude is proportional to a simulated target's range. These two signals are summed by resistors 5, 7 and 9 at junction 11. Capacitor 14 which is coupled across summing resistor 7 compensates for the input capacitance thereby providing an ideally shaped range sweep input voltage. Resistor 5 is variable to adjust for component tolerances. When the sum of the voltages at terminal 11 is almost zero, amplifier 13 conducts and produces a negative output voltage which is further amplified and inverted by amplifier 15. Zero potentiometer 17 is used to adjust the bias of amplifier 15. The output of amplifier 15 is fed back to amplifier 13 through a damping resistor 19 which stabilizes the circuit. Additionally, the output of amplifier 15 is also fed back to amplifier 13 through an RC regenerative feedback network 21, to produce faster turn on time of amplifier 13 and to reduce jitter in the overall system. The main output signal of amplifier 15 is fed directly to the input of blocking oscillator 23, which in conjunction with a pulse forming network 25, described in detail infra, generates a pulse whose width depends on the values of the particular components in the pulse width network. For purposes of discussion, it will be assumed that the output pulse from blocking oscillator 23, is an X microsecond output pulse voltage, referred to as X $\mu$sec. This pulse is then coupled to one input of an OR circuit 27 and is simultaneously coupled to one input of an AND circuit 29. An output voltage of X $\mu$sec. will be present at the output of the AND circuit 29 only if the X $\mu$sec. pulse from blocking oscillator 23 coincides with an external pulse width selection voltage applied to the second input of the AND circuit 29. This pulse width selection voltage is either a D.C. voltage or a zero voltage; a D.C. voltage when it is desired to have an output voltage of X $\mu$sec. present at the output of the AND circuit 29, or no output voltage when there is a zero input voltage applied. When a voltage is present at the output of AND circuit 29, which would be a voltage pulse of X microsecond width, this voltage would be applied to the input of blocking oscillator 31 which would generate a pulse whose width would depend on the component values of a pulse forming network 33 associated with said blocking oscillator 31. For purposes of illustrating the operation of the circuit, the particular component values would be such as to provide a pulse having a width of Y microseconds, referred to as Y $\mu$sec. The output of this blocking oscillator 31 is then applied to the second input of the OR circuit 27. An output voltage of X microseconds would be present at the output of the OR circuit 27 when there is applied at terminal C (the second input to the AND circuit 29) a pulse width selection voltage of ground or zero potential. In other words, in the first mode, where it is not desired to produce a Y $\mu$sec. output pulse voltage from blocking oscillator 31, there will be applied a pulse width selection voltage of zero potential. In the second mode of operation when it is desired to provide an output pulse from the OR circuit 27 which has a width equal to X plus Y microseconds there will be applied at terminal C, a D.C. voltage of proper magnitude so that an output signal from the AND circuit 29 will be present at the input of blocking oscillator 31. The result of this would be a Y $\mu$sec. pulse applied at the second terminal of the OR circuit 27, which however would be delayed by approximately X microseconds because of the particular components in the pulse forming network of the blocking oscillator 31. This would result in an output voltage at the OR circuit 27 which width would be equal to X plus Y $\mu$sec., since the Y $\mu$sec. pulse would be present approximately X microseconds after the X $\mu$sec. pulse generated by blocking oscillator 23. Thus depending upon a particular mode of operation chosen, there will be generated a target pulse, whose width is either X microseconds (first mode), or X plus Y microseconds (second mode). The particular pulse forming network 33 of the blocking oscillator 31 is similar to the pulse forming network used in blocking oscillator 23. The particular output pulse from OR circuit 27 is then fed to one input of AND circuit 35. This particular target pulse may be directly fed out through resistor 37, thereby providing an ungated target output pulse at output terminal N. The particular use to which this ungated target output pulse would depend upon the particular radar which is being simulated. Provisions are made in this particular target generator for five other inputs to be coupled to the AND circuit 35 and any or all of these inputs may be used depending on the requirements of the particular radar desired to be simulated.

For purposes of illustrating the operation of the device, it shall be assumed that all of the five inputs applied at terminals I–M, are used. The bearing gate coupled at terminal I determines at which bearing the simulated target is to appear. The elevation gate signal applied to terminal J determines at which elevation the simulated target is to appear. The surface video cutoff applied at terminal K is similar to the elevation gate and determines for surface radar at which elevation the simulated target is to disappear. The video cutoff and kill input signal applied at terminal L determines at which point the simulated target is to disappear due to said target being destroyed by an interceptor. The earth curvature cutoff voltage applied at point N determines at which elevation the simulated target is to disappear, that is to say when the target is below the line of sight, the target is eliminated. When the target pulse from OR circuit 27, and the voltages at the other five inputs are present at the same time, there will be present at the AND circuit 35 an output voltage which is then subsequently clipped by diode 39 and then coupled to isolation amplifier emitter follower 41. The output from emitter follower 41 is then fed to two places. One of these is to a fading circuit 43 which utilizes a diode in a conventional manner so as to vary the amplitude of the target signal from the output of the emitter follower 41 in accordance with a fading input voltage applied at terminal H to the fading circuit 43. The modulated output signal of the fading circuit 43 is then coupled to terminal G and is referred to as the "target out." The other place to which the output of emitter follower 41 is fed to is AND–OR circuit 45. This AND–OR circuit 45 functions as a controlled gating circuit and is described in detail infra. This AND–OR circuit 45 also receives an auxiliary target "OFF-ON" input signal applied at terminal D. The output from this AND–OR circuit 45 is an "auxiliary target" at terminal E and/or an "ungated target output" at terminal F.

Figure 2:
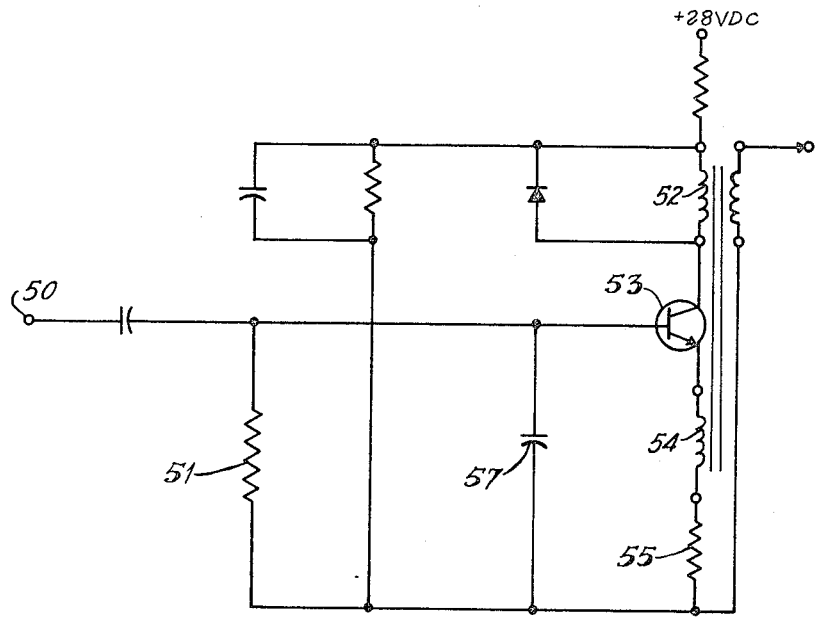
FIG. 2 is a detailed schematic of a blocking oscillator used in FIG. 1, including timing circuitry.

Referring to FIG. 2, the detailed circuitry of blocking oscillator 23, there is shown a blocking oscillator which utilizes an associated pulse forming network, comprising resistor 51 which is coupled to transistor 53 of the blocking oscillator 23 and resistor 55 coupled to the emitter of transistor 53, and capacitor 57 coupled across resistor 51. These three elements provide the pulse forming network utilized to provide the desired pulse width. The pulse forming network of blocking oscillator 31 is similarly constructed.

The circuit of FIG. 2 functions as a pulse width controlled blocking oscillator. Transistor 53 is normally non-conducting. An input pulse to base terminal 50 causes transistor 53 to start conducting. The changing current in transformer windings 52 and 54 creates a feedback voltage which biases the base circuit so that conduction in transistor 53 increases rapidly until saturation occurs. There being no further change of current, the magnetic fields surrounding windings 52 and 54 collapse, and conduction in transistor 53 ceases until another input pulse is received at terminal 50. Since the feedback voltage is connected to the base of transistor 53 through the pulse forming circuit comprised of resistor 51, capacitor 57, and resistor 55, the time that 53 conducts and the resulting pulse width is affected by the values of resistor 51, 55, and capacitor 57. Resistors 51, 55, and capacitor 57 are shown as pulse forming circuit 25, separate from blocking oscillator 23 in FIG. 1. However, the combined structure of the two components is shown in FIG. 2 for clarity of explanation.

Figure 3:
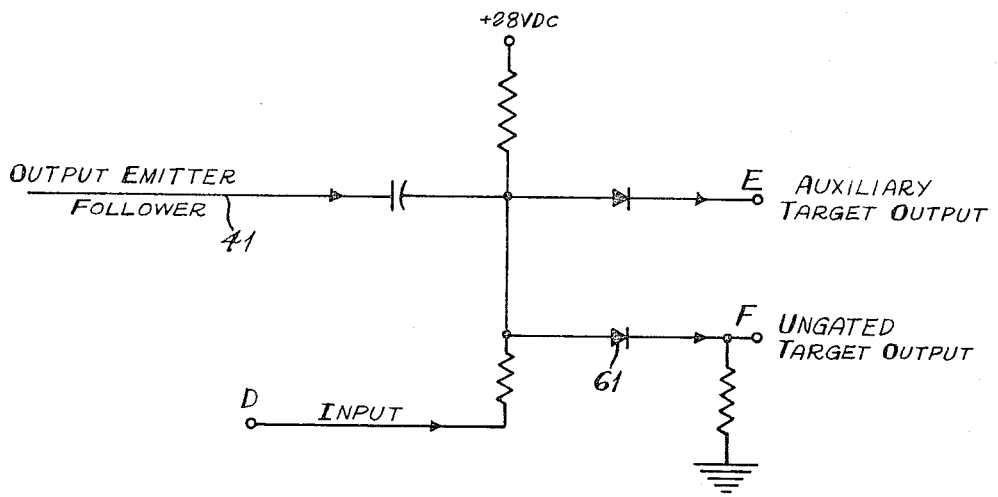
FIG. 3 is a detailed schematic of an AND-OR circuit used in FIG. 1.

Referring now to FIG. 3, there is illustrated in detail the AND–OR circuit 45 which functions as a control gate. The outputs from said circuit are an "auxiliary target" out, at terminal E, and an "ungated target" out, at terminal F. The input to said circuit is the output voltage present at emitter follower 41. If it is desired not to provide any ungated target output this may be accomplished by removing diode 61. AND–OR circuit 45 provides an output at point E and/or an output at point F, depending on whether there is an input from emitter follower 41, an input from both 41 and the auxiliary target off-on input at point D, or an input to point D only.

Obviously many modifications and variations of the present invention are possible in the light of the above teachings. It is therefore to be understood that within the scope of the appended claims the invention may be practiced otherwise than as specifically described.

What is claimed is:

1. A target generator for producing a plurality of simulated target signals, when supplied with a sawtooth range sweep signal whose amplitude at any time is proportional to the range, a D.C. target range signal whose amplitude is proportional to the range of a simulated target, and a pulse width selection signal, comprising:

sawtooth range sweep transmitting means, for transmitting said sawtooth range sweep signal;

target range transmitting means, for transmitting said target range signal;

range pulse width selection transmitting means for transmitting said pulse width selection signal;

range summing means, coupled to said sawtooth range transmitting means and said target range transmitting means, for producing a positive output signal, when the target range signal equals the range sweep signal;

amplifier means, coupled to said range summing means, for amplifying said positive output signal from said range sweep means;

first pulse generating means, coupled to said amplifier means, for producing a first output pulse of a first pulse width upon the occurrence of an output signal from said amplifier means;

first AND means, coupled to the output of said first pulse generating means and said range pulse width transmission means, having at least two inputs, for producing an output signal only when there is simultaneously present an input signal at each input thereof;

second pulse generating means, coupled to the output of said first AND circuit, for producing a second output pulse of a second pulse width, delayed in time by approximately the width of the first pulse, upon the occurrence of an output signal from said first AND means; and, OR means, having two inputs, each of which is coupled to one of the outputs of said first and second pulse generating means, for producing an output signal whenever there is at least one signal present at any input thereof.

2. The device as in claim 1, when additionally supplied with at least one conditional signal, further including:

conditional signal transmitting means, for transmitting said conditional signal; and second AND means, having a plurality of inputs, one of said inputs coupled to the output of said OR means and the other of said plurality of inputs coupled to said conditional signal transmitting means, for producing an output signal only when there is simultaneously present an input signal at each of said plurality of inputs.

3. The device as in claim 2, which further includes;

fading means, coupled to the output of said second AND means, for simulating fading of the target by varying the amplitude of the second AND output signal which is representative of the simulated target.

4. The device as in claim 3, which further includes;

control gating means, coupled to the output of said second AND means, for gating said simulated target signal.

5. The device as in claim 3, wherein said fading means includes diode means.

6. The device as in claim 3, further including; isolation means, coupled to the output to said second AND means.

No references cited.

RODNEY D. BENNETT, *Primary Examiner.*
CHESTER L. JUSTUS, *Examiner.*
T. H. TUBBESING, *Assistant Examiner.*